(12) United States Patent
Zhou et al.

(10) Patent No.: US 12,602,872 B2
(45) Date of Patent: Apr. 14, 2026

(54) DRIVABLE IMPLICIT THREE-DIMENSIONAL HUMAN BODY REPRESENTATION METHOD

(71) Applicant: ZHEJIANG UNIVERSITY, Hangzhou (CN)

(72) Inventors: Xiaowei Zhou, Hangzhou (CN); Hujun Bao, Hangzhou (CN); Sida Peng, Hangzhou (CN); Junting Dong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 261 days.

(21) Appl. No.: 18/488,962

(22) Filed: Oct. 17, 2023

(65) Prior Publication Data

US 2024/0046570 A1 Feb. 8, 2024

Related U.S. Application Data

(63) Continuation of application No. PCT/CN2021/088226, filed on Apr. 19, 2021.

(51) Int. Cl.
*G06T 17/20* (2006.01)
*G06T 15/08* (2011.01)
(Continued)

(52) U.S. Cl.
CPC .............. *G06T 17/20* (2013.01); *G06T 15/08* (2013.01); *G06T 15/10* (2013.01); *G06T 19/20* (2013.01);
(Continued)

(58) Field of Classification Search
None
See application file for complete search history.

(56) References Cited

U.S. PATENT DOCUMENTS

| | | | |
|---|---|---|---|
| 2016/0027200 A1* | 1/2016 | Corazza .................. | G06T 15/04 |
| | | | 345/420 |
| 2018/0315230 A1 | 11/2018 | Black et al. | |

(Continued)

FOREIGN PATENT DOCUMENTS

| | | |
|---|---|---|
| CN | 107945269 A | 4/2018 |
| CN | 111476883 A | 7/2020 |

(Continued)

OTHER PUBLICATIONS

International Search Report (PCT/CN2021/088226); Date of Mailing: Jan. 20, 2022.

*Primary Examiner* — Andrew G Yang
(74) *Attorney, Agent, or Firm* — Wiersch Law Group

(57) ABSTRACT

A drivable implicit three-dimensional human body representation method, which is used for performing dynamic reconstruction by means of optimizing a three-dimensional representation of a drivable model from an input multi-view video. The method comprises: constructing an implicit function used for representing a dynamic human body; providing a neural skin hybrid weight field represented by a neural network, thereby implementing a method for learning and obtaining a drivable implicit function from a video, and optimizing and obtaining a drivable three-dimensional model from a video; learning a neural skin hybrid weight field in each video frame, and transforming a three-dimensional point of each video frame back to a standard coordinate system, so as to integrate time sequence information of a video and enhance observation of a target, thereby optimizing a three-dimensional model in the standard coordinate system; and learning a neural skin hybrid weight field in the standard coordinate system, such that the three-dimensional model can be driven to generate a three-dimensional model in a new pose.

6 Claims, 1 Drawing Sheet

Input: multi-view video

1ˢᵗ frame     100ᵗʰ frame     200ᵗʰ frame

Output: drivable three-dimensional model

Synthesized picture     Generated three-dimensional model

(51) Int. Cl.
    G06T 15/10           (2011.01)
    G06T 19/20           (2011.01)

(52) U.S. Cl.
    CPC ................. *G06T 2219/2012* (2013.01); *G06T 2219/2016* (2013.01)

(56)           References Cited

U.S. PATENT DOCUMENTS

| | | | | |
|---|---|---|---|---|
| 2020/0272834 A1* | 8/2020 | Motoyama | ............ | G06F 18/251 |
| 2021/0312686 A1* | 10/2021 | Lin | ........................ | G06T 3/067 |
| 2022/0207770 A1* | 6/2022 | Liu | ........................ | G06T 7/579 |
| 2023/0316651 A1* | 10/2023 | Zhou | .................... | G06T 3/4007 |
| | | | | 345/420 |

FOREIGN PATENT DOCUMENTS

| | | | | |
|---|---|---|---|---|
| CN | 112465955 A | 3/2021 | | |
| CN | 113077545 | * 7/2021 | ............. | G06T 17/00 |
| WO | WO-2021221657 A1 | * 11/2021 | ............. | G06T 19/20 |

\* cited by examiner

DRIVABLE IMPLICIT THREE-DIMENSIONAL HUMAN BODY REPRESENTATION METHOD

CROSS-REFERENCE TO RELATED APPLICATIONS

The present application is a continuation of International Application No. PCT/CN2021/088226, filed on Apr. 19, 2021, the content of which is incorporated herein by reference in their entirety.

TECHNICAL FIELD

The present application belongs to the field of three-dimensional reconstruction, in particular to a drivable implicit three-dimensional human body representation method.

BACKGROUND

The present application proposes a drivable implicit function to represent a dynamic human body, and a drivable three-dimensional model can be reconstructed from a multi-view video for generation of a three-dimensional model and free-view synthesis. In the related art, it often takes a high cost and a lot of time to reconstruct a drivable three-dimensional model with traditional methods. These methods need complex hardware devices to reconstruct the model, and in the later stage, the designers need to bind the skeleton to the three-dimensional model for control, and design skinning blend weights, which takes a lot of time. Recently, in some works, the dynamic human body is expressed as a hidden function based on a neural network. However, it is difficult for these methods to obtain an optimal implicit function only from the video, and additional constraints are required. Moreover, it is not possible to obtain a drivable three-dimensional model with these methods. The present application aims to propose a new dynamic human body representation method, which enables leaning of an implicit function representation from the video to be solvable, and can output a drivable three-dimensional model.

SUMMARY

The present application aims to provide a drivable implicit three-dimensional human body representation method aiming at the deficiency of the prior art. The drivable implicit function is used for representing the geometry and appearance of a human body, and the dynamic human body representation is reconstructed through differential rendering.

The object of the present application is achieved through the following technical solution: a drivable implicit three-dimensional human body representation method includes the following steps of:

(1) Constructing a neural network implicit function in a standard coordinate system to represent a geometry and an appearance of a human body, generating a skinning blend weight of any three-dimensional point in each video frame coordinate system by using the neural network implicit function, constructing a neural skinning blend weight field, and transforming the three-dimensional points of a video frame back to the standard coordinate system to represent a dynamic human body.

(2) Learning the neural skinning blend weight field in the standard coordinate system and optimizing the neural network implicit function, so that the neural network implicit function in the standard coordinate system can be driven to generate a three-dimensional human body in a new state; the specific learning process is as follows:

(2.1) Rendering the neural network implicit function into a two-dimensional image based on a differentiable volume renderer; optimizing a representation of the neural network implicit function by minimizing an error between the rendered two-dimensional image and a corresponding image in a multi-view video.

(2.2) Minimizing a difference between the skinning blend weights of corresponding three-dimensional points in the standard coordinate system and the video frame coordinate system, and optimizing the representation of the neural network implicit function of the skinning blend weight.

(3) Performing generation of a three-dimensional model of the human body and view synthesis based on the optimized neural network implicit function in step (2).

Further, the constructed neural skinning blend weight field is combined with a set of three-dimensional key points of the human body, and the three-dimensional points in the video frame coordinate system are transformed back to the standard coordinate system by a linear blend skinning algorithm.

Further, after learning the neural skinning blend weight field in the standard coordinate system, when a new set of three-dimensional key points of the human body are given, the neural skinning blend weight field in the standard coordinate system can be combined with the key points, and the three-dimensional points in the standard coordinate system are transformed by a linear blend skinning algorithm, thereby generating the three-dimensional human body in the new state.

Further, the step of rendering the neural network implicit function into a two-dimensional image based on a differentiable volume renderer comprises: sampling a set of three-dimensional points along light projected to a pixel by a camera, transforming the three-dimensional points back to the standard coordinate system by a linear blend skinning algorithm, calculating voxel densities and colors of the three-dimensional points by using the neural network implicit function, and accumulating volume densities and colors on the light to obtain a pixel color.

Further, the corresponding three-dimensional points in the standard coordinate system and the video frame coordinate system are sampled, and the corresponding skinning blend weights are calculated to minimize the difference of the skinning blend weights of two three-dimensional points, thereby optimizing the neural network implicit function of the skinning blend weight.

Further, during the generation of the three-dimensional model, a Marching cubes algorithm is used to extract a three-dimensional mesh model from the optimized neural network implicit function, and the three-dimensional mesh model is driven according to a linear blend skinning algorithm.

Further, during the view synthesis, the differentiable volume renderer is used to obtain the two-dimensional image.

The method has the beneficial effects that a neural skinning blend weight field represented by a neural network is proposed, so that a drivable hidden function is obtained by learning from the video, and the method is the first method for obtaining the drivable three-dimensional model from the video by optimization. According to the present application, a neural skinning blend weight field is learned in each video frame, and the three-dimensional points of each video frame are transformed back to a standard coordinate system, so that the time sequence information of the video is integrated, the observation of the target is improved, and the three-dimensional model in the standard coordinate system is optimized; at the same time, according to the present application, a neural skinning blend weight field is learned in the standard coordinate system, so that the three-dimensional model can be driven to generate a three-dimensional model in a new posture. The present application can obtain high-quality three-dimensional reconstruction and view synthesis effects from multi-view videos.

BRIEF DESCRIPTION OF DRAWINGS

FIG. 1 is an input and output schematic diagram of the present application.

FIG. 2 is a schematic diagram of generating continuous voxel densities and colors of different video frames based on the drivable implicit function of the present application.

DESCRIPTION OF EMBODIMENTS

The technical details and principles of the present application will be further described with reference to the accompanying drawings:

The present application provides a drivable implicit three-dimensional human body representation method. As shown in FIG. 1, the present application optimizes and reconstructs a drivable implicit function from an input multi-view video. The reconstructed implicit function can be used for generation of a three-dimensional model of a human body and view synthesis. The specific process is as follows.

(1) A neural network implicit function is constructed in a standard coordinate system to represent a geometry and an appearance of a human body, a skinning blend weight of any three-dimensional point is generated in each video frame coordinate system by using the neural network implicit function, a neural skinning blend weight field is constructed, the constructed neural skinning blend weight field is combined with a set of three-dimensional key points of the human body, and the three-dimensional points in the video frame coordinate system are transformed back to the standard coordinate system by a linear blend skinning algorithm for representing a dynamic human body.

(2) The neural skinning blend weight field is learned in the standard coordinate system and the neural network implicit function is optimized, so that the neural network implicit function in the standard coordinate system can be driven to generate a three-dimensional human body in a new state; the specific learning process is as follows: when a new set of three-dimensional key points of the human body are given, the neural skinning blend weight field in the standard coordinate system can be combined with the key points, and the three-dimensional points in the standard coordinate system are transformed by a linear blend skinning algorithm, thereby generating the three-dimensional human body in a new state.

The specific learning process is as follows:

(2.1) The neural network implicit function into a two-dimensional image is rendered based on a differentiable volume renderer, including the following steps: sampling a set of three-dimensional points along light projected to a pixel by a camera, transforming the three-dimensional points back to the standard coordinate system by a linear blend skinning algorithm, calculating voxel densities and colors of the three-dimensional points by using the neural network implicit function, and accumulating volume densities and colors on the light to obtain a pixel color.

The representation of the neural network implicit function is optimized by minimizing an error between the rendered two-dimensional image and a corresponding image in a multi-view video.

(2.2) The corresponding three-dimensional points in the standard coordinate system and the video frame coordinate system are sampled, and the corresponding skinning blend weights are calculated to minimize the difference of the skinning blend weights of two three-dimensional points, thereby optimizing the neural network implicit function of the skinning blend weight.

(3) Generation of a three-dimensional model of the human body and view synthesis are performed based on the optimized neural network implicit function in step (2). Specifically, during the generation of the three-dimensional model, a Marching cubes algorithm is used to extract a three-dimensional mesh model from the optimized neural network implicit function, and the three-dimensional mesh model is driven according to a linear blend skinning algorithm. During the view synthesis, the differentiable volume renderer is used to obtain the two-dimensional image.

As shown in FIG. 2, in the drivable implicit three-dimensional human body representation method proposed by the present application, the specific steps of constructing a drivable implicit function for representing a dynamic human body are as follows:

1. The present application represents a dynamic human body based on a model in a standard coordinate system and a skinning blend weight field in a video frame coordinate system. The model in the standard coordinate system is represented by continuous voxel densities and colors, in which the voxel density field and color field are realized by a multi-layer perceptron network. For a specific frame i in a multi-view video, the deformation field from the video frame coordinate system to the standard coordinate system is $T_i$, and the specific construction method will be introduced below. The present application expresses the voxel density prediction of a spatial three-dimensional point x in the video frame coordinate system as the following function:

$$\sigma_i(x), z_i(x) = F_\sigma(\gamma_x(T_i(x)))$$

where $F_\sigma$ represents a multi-layer perceptron network with four fully connected layers, $\gamma_x$ represents a coding function acting on the position of the three-dimensional point x, $\sigma_i(x)$ and $z_i(x)$ represent the voxel density and shape feature of the three-dimensional point x in the specific frame i, respectively.

Regarding the color function, the present application takes the shape feature $z_i(x)$ and the viewing angle direction d as the input of the function. In addition, the present application defines a global hidden variable $\ell_i$ as an input for each frame, which is used to encode the state of the human appearance in the frame. The color function is defined as follows:

$$c_i(x) = F_c(z_i(x), \gamma_d(d), \ell_i)$$

where $F_c$ represents a multi-layer perceptron network with two fully connected layers, $\gamma_d$ represents a position coding function acting on the viewing angle direction d, and $c_i(x)$ represents the color of the three-dimensional point x in the specific frame i.

As shown in FIG. 2, in the dynamic hidden variable proposed by the present application, the specific steps of constructing a deformation field are as follows:

1. The human body is driven by the human skeleton, there are K body parts and k transformation matrices can be generated. In the linear blend skinning algorithm, a three-dimensional point v in the standard coordinate system can be transformed into a three-dimensional point v' in the coordinate system of a certain video frame by the following formula:

$$v' = \left(\sum\nolimits_{k=1}^{K} w(v)_k G_k\right) v$$

where $w(v)_k$ represents the skin mixing weight of the $k^{th}$ body part, $G_k$ represents a transformation matrix of the $k^{th}$ body part. Similarly, for a three-dimensional point x in the coordinate system of a certain video frame, if the skinning blend weight corresponding to the three-dimensional point is known in the present application, the present application can transform the three-dimensional point x into a three-dimensional point x' in the standard coordinate system by the following formula:

$$x' = \left(\sum\nolimits_{k=1}^{K} w^o(x)_k G_k\right)^{-1} x$$

where $w^o(x)_k$ represents the skinning blend weight defined in the video frame coordinate system, and $G_k$ represents the transformation matrix of the $k^{th}$ body part.

2. The present application uses a neural network to generate the skinning blend weight of any three-dimensional point in the video frame coordinate system. A direct way is to use a fully connected network to map any three-dimensional points into a skinning blend weight. Another way is to first calculate the initial skinning blend weight of each three-dimensional point according to a statistical driving model, then generate a residual weight using the fully connected network, and finally obtain a final skinning blend weight from the two weights. The skinning blend weight generated in this way is defined as:

$$w_i(x) = \text{norm}(F_{\Delta w}(x, \psi_i) + w^s(x, S_i))$$

where $S_i$ represents a statistical driving model, $w^s$ represents an initial skinning blend weight calculated based on the statistical driving model $S_i$, $F_{\Delta w}(x, \psi_i)$ represents a fully connected network for calculating the residual weight, $\psi_i$ represents the weight hidden variable shown in FIG. 2, and norm is the normalized function. An example of implementation is that the initial skinning blend weight $w^s$ of any three-dimensional point can be generated according to a SMPL model.

3. The present application also generates a skinning blend weight field $w^{can}$ in the standard coordinate system. For any three-dimensional point, the initial skinning blend weight is calculated based on the statistical driving model in a standard state. At the same time, the present application defines a weight hidden variable $\psi^{can}$ in the standard coordinate system as the input of the fully connected network $F_{\Delta w}(x, \psi_i)$ for calculating the residual weight.

In the drivable implicit three-dimensional human body representation method provided by the present application, the drivable neural network implicit function representation is optimized through differential rendering. The specific steps are as follows:

1. Differentiable volume rendering: for a given viewing angle, the representation of a neural network implicit function is converted into a two-dimensional RGB image by using a differentiable volume renderer. For each pixel of the image, the differential volume renderer accumulates the volume densities and colors on the camera ray through an integral equation to obtain the pixel color. In actual implementation, the present application uses numerical integration for approximation. Firstly, the camera parameters are used to calculate the corresponding camera ray r, and then $N_k$ three-dimensional points are sampled between the nearest point and the farthest point. The nearest point and farthest point here can be calculated according to the SMPL model. Then, the present application uses the neural network implicit function to calculate the voxel density and color of the three-dimensional point at each three-dimensional point. For a specific frame i in a multi-view video, the rendered color $\tilde{c}_i(r)$ of a pixel is defined as:

$$\tilde{C}_i(r) = \sum\nolimits_{k=1}^{N_k} T_k (1 - \exp(\sigma_i(x_k)\delta_k)) c_i(x_k)$$

$$T_k = \exp\left(-\sum\nolimits_{j=1}^{k-1} \sigma_i(x_j)\delta_j\right)$$

where $\delta_k = \|x_{k+1} - x_k\|_2$ represents the distance between adjacent sampling points, $\sigma_i(x_k)$ and $c_i(x_k)$ represent the colors of the three-dimensional point $x_k$ of a specific frame i, $N_k$ represents the number of three-dimensional points sampled on the camera ray r. By adopting differentiable volume rendering, the present application optimizes the representation of the neural network implicit function based on structured hidden variables by minimizing the error between the rendered image of each frame and the corresponding frame and the corresponding view image in the multi-view video.

2. The representation of the implicit function based on a drivable neural network is optimized, specifically: for the input multi-view video, all cameras are calibrated in advance and the camera parameters are known. For each picture, the present application uses a segmentation method to segment the foreground person and sets the background pixel value to 0. The present application jointly optimizes parameters $F_\sigma$, $F_c$, $F_{\Delta w}$, $\{\ell_i\}$, $\{\psi_i\}$ to minimize the following objective function:

$$L_{rgb} = \sum\nolimits_{r \in \mathcal{R}} \|\tilde{C}_i(r) - C_i(r)\|_2$$

where $\mathcal{R}$ represents the set of camera rays that pass through the picture pixels and $C_i(r)$ represents a true pixel value.

In addition, in order to learn the skinning blend weight field $w^{can}$ in the standard coordinate system, the present application introduces a consistency loss function of the skinning blend weight field, that is, the corresponding points in the standard coordinate system and the video frame coordinate system should have the same skinning blend weight. For the three-dimensional point x in the coordinate system of the $i^{th}$ frame, the above formula can be used to map to the point $T_i(x)$ in the standard coordinate system, and the consistency loss function is as follows:

$$L_{nsf} = \sum\nolimits_{x \in X_i} \|w_i(X) - w^{can}(T_i(x))\|_1$$

where $X_i$ represents a set of three-dimensional points sampled in the three-dimensional human body bounding box in the coordinate system of the $i^{th}$ frame. In addition, the coefficients of $L_{rgb}$ and $L_{nsf}$ are both set to be 1.

The dynamic three-dimensional reconstruction and view synthesis provided by the present application specifically includes the following steps:

1. View synthesis: in order to generate different human bodies according to given key points and synthesize pictures, the present application constructs a deformation field according to the input key points, and transforms the three-dimensional points under the key points into a standard coordinate system. A new set of key points of human body is given, the present application firstly updates the statistical driving model $S^{new}$ and calculates the initial skin mixing weight $w^s$ of each three-dimensional point accordingly. Then the final skinning blend weight is calculated according to the following formula:

$$w^{new}(x,\psi^{new})=\mathrm{norm}(F_{\Delta w}(x,\psi^{new})+w^s(x,S^{new}))$$

where $\psi^{new}$ represents a weight hidden variable in the new state. The parameters of $\psi^{new}$ are optimized according to the following formula:

$$L_{new}=\sum_{x\in\mathcal{X}^{new}}\|w^{new}(x)-w^{can}(T^{new}(x))\|_1$$

where $T^{new}$ represents a deformation field from the coordinate system in the new state to the standard coordinate system, $\mathcal{X}^{new}$ represents a set of three-dimensional points sampled in the three-dimensional box of the human body. It should be noted that the parameters of $w^{can}$ are fixed in training.

2. Generation of a three-dimensional model: based on the optimized neural network implicit function, the present application firstly needs to discretize the continuous space into uniform voxels. Firstly, the spatial range of human body is determined, and the space is divided into a set of voxels with a size of 5 mm×5 mm×5 mm. According to the present application, the voxel density is calculated for each voxel, and finally a human body mesh model is extracted by Marching cubes algorithm. Then the skinning blend weight is calculated on each human body mesh node. Finally, the key points are given, the present application drives the grid nodes to obtain a new three-dimensional model.

The above-mentioned embodiments are used to explain, rather than to limit the present application. Any modification and change made to the present application within the scope of protection of the spirit and claims of the present application shall fall within the scope of protection of the present application.

What is claimed is:

1. A drivable implicit three-dimensional human body representation method, comprising:

step (1): constructing a neural network implicit function in a standard coordinate system to represent a geometry and an appearance of a human body, generating a skinning blend weight of any three-dimensional point in each video frame coordinate system by using the neural network implicit function, constructing a neural skinning blend weight field, and transforming the three-dimensional points of a video frame back to the standard coordinate system to represent a dynamic human body;

step (2): learning the neural skinning blend weight field in the standard coordinate system and optimizing the neural network implicit function, in such a manner that the neural network implicit function in the standard coordinate system is capable of being driven to generate a three-dimensional human body in a new state; wherein a specific learning process comprises:

sub-step (2.1): rendering the neural network implicit function into a two-dimensional image based on a differentiable volume renderer; optimizing a representation of the neural network implicit function by minimizing an error between the rendered two-dimensional image and a corresponding image in a multi-view video;

wherein in sub-step (2.1), the step of rendering the neural network implicit function into a two-dimensional image based on a differentiable volume renderer comprises: sampling a set of three-dimensional points along light projected to a pixel by a camera, transforming the three-dimensional points back to the standard coordinate system by a linear blend skinning algorithm, calculating voxel densities and colors of the three-dimensional points by using the neural network implicit function, and accumulating volume densities and colors on the light to obtain a pixel color;

sub-step (2.2): minimizing a difference between skinning blend weights of corresponding three-dimensional points in the standard coordinate system and the video frame coordinate system, and optimizing the representation of the neural network implicit function of the skinning blend weight; and step (3) performing generation of a three-dimensional model of the human body and view synthesis based on the optimized neural network implicit function in step (2).

2. The drivable implicit three-dimensional human body representation method according to claim 1, wherein in step (1), the constructed neural skinning blend weight field is combined with a set of three-dimensional key points of the human body, and the three-dimensional points in the video frame coordinate system are transformed back to the standard coordinate system by a linear blend skinning algorithm.

3. The drivable implicit three-dimensional human body representation method according to claim 1, wherein in step (2), after learning the neural skinning blend weight field in the standard coordinate system, when a new set of three-dimensional key points of the human body are given, the neural skinning blend weight field in the standard coordinate system is capable of being combined with the key points, and the three-dimensional points in the standard coordinate system are transformed by a linear blend skinning algorithm, in such a manner that the three-dimensional human body in the new state is generated.

4. The drivable implicit three-dimensional human body representation method according to claim 1, wherein in step (2.2), the corresponding three-dimensional points in the standard coordinate system and the video frame coordinate system are sampled, and the corresponding skinning blend weights are calculated to minimize the difference of the skinning blend weights of two three-dimensional points, in such a manner that the neural network implicit function of the skinning blend weight is optimized.

5. The drivable implicit three-dimensional human body representation method according to claim 1, wherein in step (3), during the generation of the three-dimensional model, a Marching cubes algorithm is used to extract a three-dimensional mesh model from the optimized neural network implicit function, and the three-dimensional mesh model is driven according to a linear blend skinning algorithm.

6. The drivable implicit three-dimensional human body representation method according to claim 1, wherein in step (3), during the view synthesis, the differentiable volume renderer is used to obtain the two-dimensional image.

* * * * *